(12) United States Patent
Frazier et al.

(10) Patent No.: US 8,746,395 B2
(45) Date of Patent: Jun. 10, 2014

(54) OPERATOR INTERFACE FOR MACHINE CONTROL

(75) Inventors: Brent Ryan Frazier, Morton, IL (US); David Allen Ober, Peoria, IL (US); Bryan Everett Copeland, Bartonville, IL (US); Todd Bartholomew Smith, Peoria, IL (US); Shane C. McBride, Denver, CO (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/474,259

(22) Filed: May 17, 2012

(65) Prior Publication Data

US 2013/0306395 A1 Nov. 21, 2013

(51) Int. Cl.
*B60K 26/02* (2006.01)

(52) U.S. Cl.
USPC ........ 180/333; 180/335; 180/336; 74/471 XY

(58) Field of Classification Search
CPC .................................................... E02F 9/2004
USPC ............ 180/333, 335, 336; 74/473.3, 473.33, 74/473.12, 543; 200/556, 339
See application file for complete search history.

(56) References Cited

U.S. PATENT DOCUMENTS

| | | | | |
|---|---|---|---|---|
| 3,519,775 | A * | 7/1970 | Weremey | 200/556 |
| 4,095,071 | A * | 6/1978 | Chamberlain | 200/332.2 |
| 4,334,130 | A * | 6/1982 | Beig | 200/61.54 |
| 4,444,284 | A * | 4/1984 | Montemurro | 180/19.1 |
| 4,700,802 | A | 10/1987 | Fought | |
| 4,701,542 | A | 10/1987 | Tessier et al. | |
| 5,365,803 | A * | 11/1994 | Kelley et al. | 74/484 R |
| 5,918,195 | A | 6/1999 | Halgrimson et al. | |
| 6,282,482 | B1 * | 8/2001 | Hedstrom | 701/93 |
| 6,474,186 | B1 * | 11/2002 | Vollmar | 74/335 |
| 7,493,981 | B2 * | 2/2009 | Kustosch et al. | 180/170 |
| 7,838,789 | B2 * | 11/2010 | Stoffers et al. | 200/553 |
| 8,151,928 | B2 * | 4/2012 | States et al. | 180/315 |
| 8,212,770 | B2 * | 7/2012 | Obourn et al. | 345/161 |
| 2002/0178624 | A1 * | 12/2002 | Yamamoto et al. | 37/348 |
| 2006/0137931 | A1 * | 6/2006 | Berg et al. | 180/333 |
| 2011/0088961 | A1 | 4/2011 | Case et al. | |

* cited by examiner

*Primary Examiner* — Ruth Ilan
(74) *Attorney, Agent, or Firm* — Miller, Matthias & Hull

(57) ABSTRACT

An operator interface for advanced transmission control of a vehicle is disclosed. The operator interface may include a hand operated joystick mounted on a vehicle and a roller mounted on the joystick, the roller having at least two detents for providing at least four distinct states of speed control, the at least four distinct states including one or more increasing states and one or more decreasing states. In another embodiment, the roller of the operator interface may include at least one detent for providing at least three distinct states of speed control, the at least three distinct states including at least one increasing state, at least one decreasing state, and at least one other speed state provided in one of either an increasing state or a decreasing state.

5 Claims, 6 Drawing Sheets

OPERATOR INTERFACE FOR MACHINE CONTROL

TECHNICAL FIELD OF THE DISCLOSURE

The present disclosure relates to machines and, more particularly, relates to operator interfaces for controlling machines, such as e.g., transmissions of machines.

BACKGROUND OF THE DISCLOSURE

A variety of work, construction or earth moving machines such as, motor graders, backhoe and wheel loaders, skid-steer loaders, paving machines, harvesters, etc. require operator control for controlling various aspects of the machine. For example, many, if not all, of the aforementioned vehicles may have various work implements associated therewith for accomplishing certain types of tasks, which may require operator control. Navigating the vehicle, as well as controlling speed of the vehicle is also often accomplished by requiring operator control.

Operator control of the vehicle typically requires an operator to manipulate one or more operator interfaces having numerous controls for controlling, operating and navigating the vehicle. For controlling a multi-speed advanced transmission often employed in work, construction or earth moving machines, the operator interface typically includes a hand-held control mechanism such as joystick. Conventionally, such joysticks have multiple push buttons that provide speed control. These push buttons, thus, offer multiple outputs from multiple inputs.

Controlling the transmission with multiple push buttons requires operators with high skill levels. Learning the push button controls in order to properly control an advanced multi-speed transmission not only takes time, it may be counter-intuitive. Furthermore, given that operators have to control several other control mechanisms, those operators may become fatigued. Additionally, because the operator's hand may be required to travel from one push button to another, a delayed reaction time, as well as the complexity of the controls, may result in lost time, increased costs and lowered productivity.

It would accordingly be beneficial if an improved and more intuitive hand-operated operator interface for controlling an advanced transmission of a vehicle is developed. It would additionally be beneficial if such an operator interface could be used by operators of all skill levels.

SUMMARY OF THE DISCLOSURE

In accordance with one aspect of the present disclosure, an operator interface for advanced transmission control is disclosed. The operator interface may include a hand operated joystick mounted on a vehicle and a roller mounted on the joystick, the roller having at least two detents for providing at least four distinct states of speed control, the at least four distinct states including at least two speed increasing states and at least two speed decreasing states. In accordance with a further aspect of the present disclosure, the roller of the operator interface may include at least one detent for providing at least three distinct states of speed control, the at least three distinct states including at least one increasing state, at least one decreasing state, and at least one other speed state provided in one of either an increasing state or a decreasing state.

In accordance with another aspect of the present disclosure, a thumb actuated roller device for controlling speed of a vehicle is disclosed. The roller device may include an actuator blade capable of being adjusted in a plurality of states, the plurality of states may include a smaller increment state, a larger increment state, a smaller decrement state and a larger decrement state. The actuator blade may also define a neutral position between the smaller increment state and the smaller decrement state. The roller device may also include a first detent provided between the smaller increment state and the larger increment state and a second detent provided between the smaller decrement state and the larger decrement state.

In accordance with yet another aspect of the present disclosure, a method for an advanced transmission control of a vehicle is disclosed. The method may include providing an operator interface having a thumb actuated roller, the thumb actuated roller defining a speed increasing region having a first detent and a speed decreasing region having a second detent, the thumb actuated roller further defining a neutral position between the speed increasing region and the speed decreasing region. The method may also include actuating the thumb actuated roller by thumb to move from the neutral position in either the speed increasing region or the speed decreasing region to facilitate a gear change for controlling the advanced transmission of the vehicle.

These and other aspects and features will become more apparent upon reading the following detailed description and accompanying drawings.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION OF THE DISCLOSURE

Figure 1:
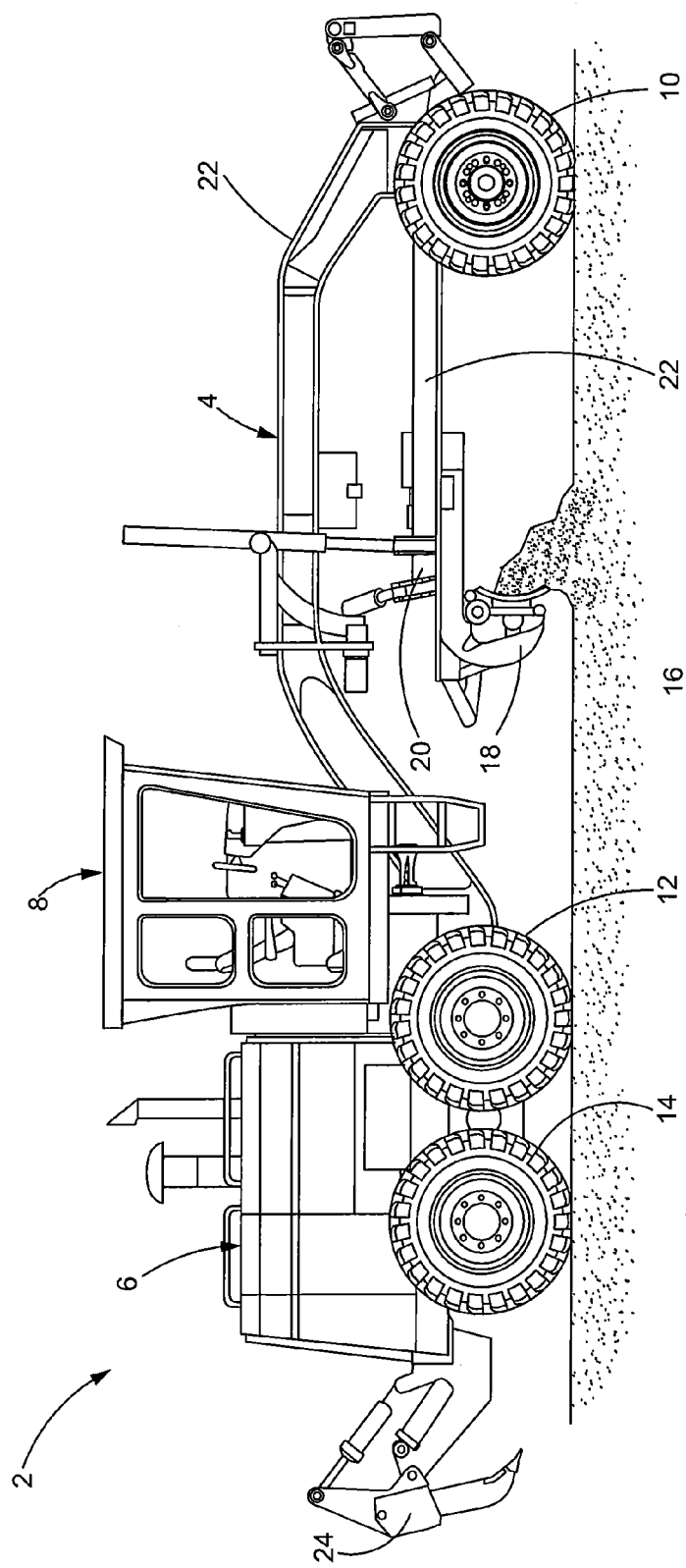
FIG. 1 is a perspective view of an exemplary motor grader, in accordance with at least some embodiments of the present disclosure.

The present disclosure sets forth a hand-held operator interface having a thumb actuated roller for controlling transmission of a machine as described in detail below. Referring now to the drawings, and with specific reference to FIG. 1, an exemplary machine 2 is shown, in accordance with at least some embodiments of the present disclosure. While the machine 2 has been shown to be a motor grader, it will be understood that in other embodiments, the machine may be a skid-steer loader, a backhoe-loader, a track or wheel type tractor or loader, a harvester, a paving machine, or any other type of construction, agricultural, or earth moving machine that utilizes a hand held control mechanism for accomplishing a task.

With respect to the machine 2, it may include a front frame structure 4 connected to a rear frame structure 6 via an operator station 8. The machine 2 may further include front wheels 10 and a pair of tandem rear wheels 12 and 14. A moldboard 16 may be mounted on an articulation mechanism 18 supported by a circle 20 disposed beneath the front frame structure 6. The circle 20 may in turn be supported by a drawbar 22 connected to the front frame structure 4. The moldboard 16 may be moved or adjusted to obtain a range of different positions and angles by way of the circle 20 and a hydraulic mechanism 22 mounted on or in the front frame structure 4.

The rear frame structure 6 of the machine 2 may house an engine (not shown) and other power train components (not shown) for generating and delivering power to operate the machines. The engine may be any of a gasoline, diesel, or any other engine that are employed with such machines. The machine 2 may even draw power from other power sources, such as natural gas, fuel cells, etc. Relatedly, while the transmission of the machine 2 may typically be a continuous variable transmission (CVT), in at least some embodiments, the transmission may be any of a variety of types that are commonly employed in work or construction machines. For example, in some embodiments, the transmission may be automatic, semi-automatic, manual, direct-drive, or any transmission having a variable output or modulated gear ratio. The rear frame structure 6 may also be employed to attach any additional work implements, such as a blade 24.

With respect to the operator station 8, although not visible, it may include a plurality of operator controls for controlling the operation of the machine 2 and the various work implements connected thereto, as well as for navigating and steering the machine on a work surface. For instance, the operator station 8 may house various hand controlled operator interfaces, such as, joystick controls (one of which is described below), instrument panels, gauges and warning lamps for keeping the operator aware of any critical system information, as well as safety and convenience features such as cup holders, lighters, etc. Other devices and components that commonly exist in such vehicles may be present in the operator station 8 of the machine 2.

Notwithstanding the components of the machine 2 described above, it will be understood that several other components of the machine, as well as components that may be employed in combination or conjunction with the machine are contemplated and considered within the scope of the present disclosure.

Figure 2A:
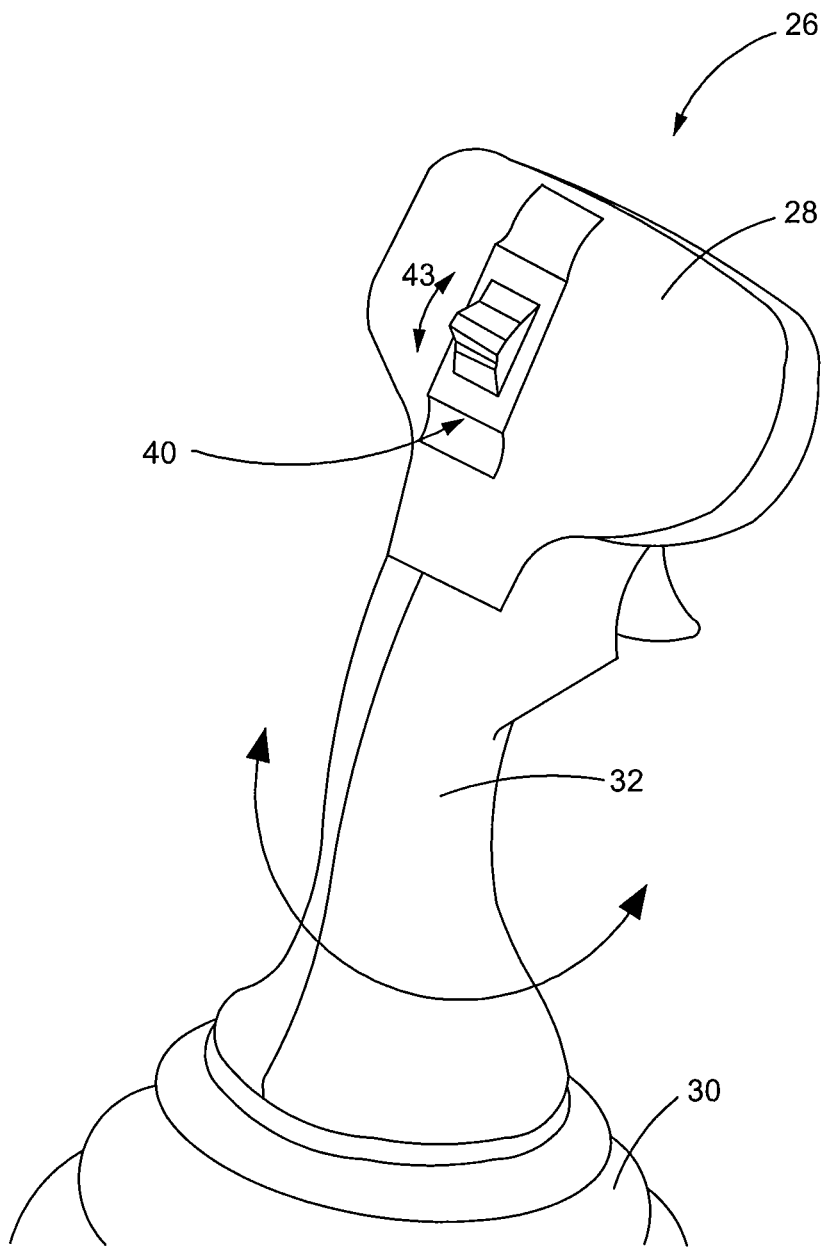
FIG. 2A is a schematic illustration of an operator interface for use with the motor grader of FIG. 1, in accordance with at least some embodiments of the present disclosure.

Turning now to FIG. 2A, an exemplary schematic diagram of an operator interface 26 is shown, in accordance with at least some embodiments of the present disclosure. As shown, the operator interface 26 may be a hand-operated joystick having an upper portion 28 facing the operator and connected to a base portion 30 via a shaft or grip portion 32. Specifically, the operator interface 26 may be a left-hand multi-function joystick controller that may be positioned within the operator station 8 for controlling the direction and speed of the machine 2. The upper portion 28 may have a roller 40, which may be thumb operated for rotation in directions represented by arrow 43. As described in greater detail below, the roller 40 may be employed for proportionally controlling a continuously or infinitely variable advanced transmission (e.g., CVT transmission) of the machine 2 for making speed and output gear ratio changes. Although described herein as applying to transmission control, it will be understood that the roller 40 may also be used for non-transmission applications, such as, for example, controlling the circle 20, the drawbar 22, other work implements of the machine 2, or for navigating the machine, without departing from the scope of the disclosure.

Figure 2B:
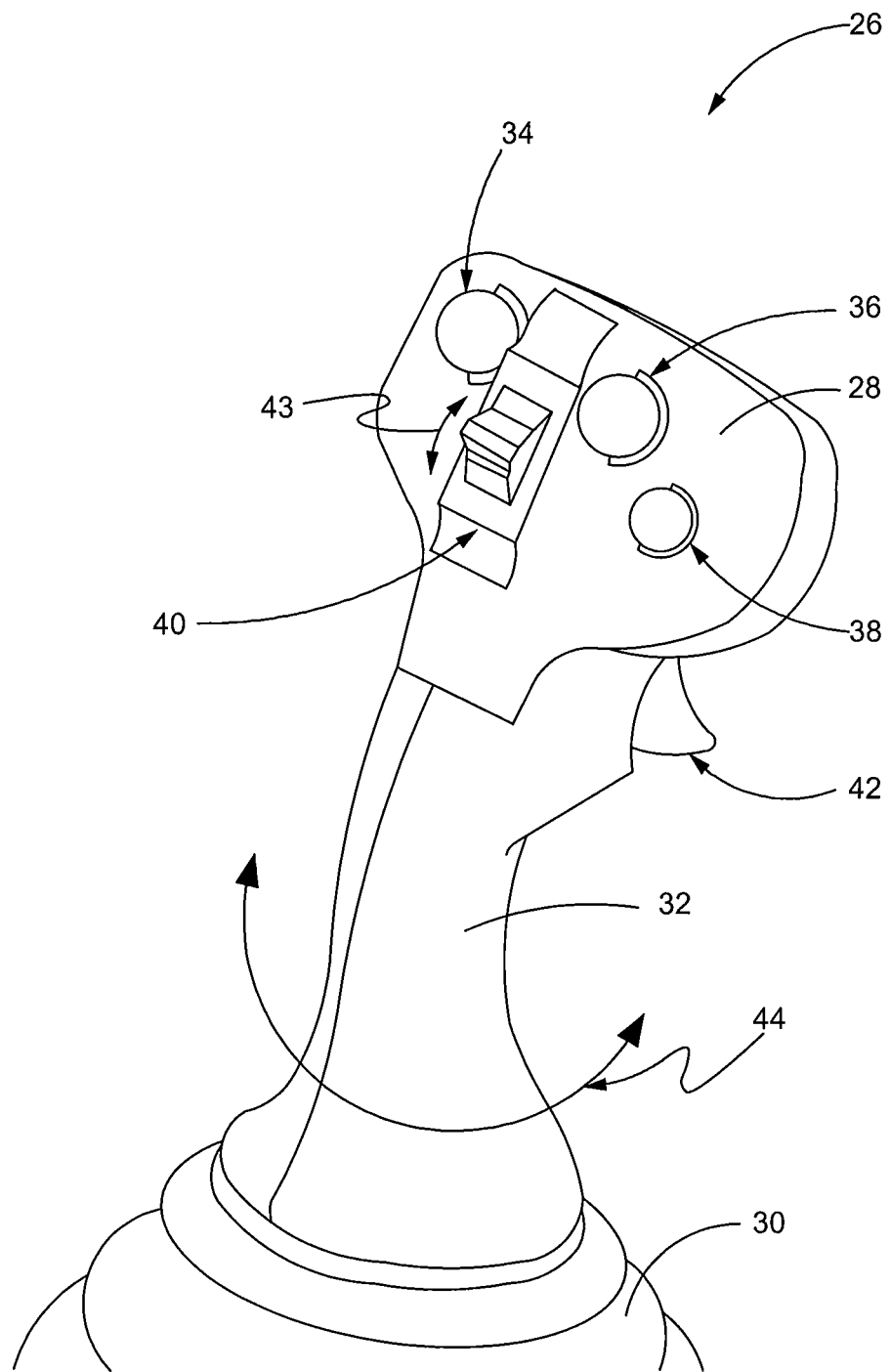
FIG. 2B is a schematic illustration of another operator interface for use with the motor grader of FIG. 1, in accordance with at least some embodiments of the present disclosure.

Referring now to FIG. 2B, the upper portion 28 of the operator interface 26 may have, in addition to the roller 40, a plurality of buttons and/or controls, such as, including but not limited to, left and right wheel lean buttons 34 and 36, respectively, a return-to-neutral articulation button 38, and a lever 42. The left wheel lean button 34 and the right wheel button 36 may be employed for leaning the front wheels 10 of the machine 2 in respective left or right directions to allow the operator to make steering corrections and to permit varying angles of operation of the moldboard 16. The return-to-neutral articulation button 38 may be employed to automatically return the machine 2 to a straight frame position from any articulation angle with the touch of a single button. Such single-touch functionality of the button 38 not only improves productivity of the operator, it also enhances safety by allowing the operator to focus on controlling the moldboard 16. The lever 42 may be employed for shifting transmission of the machine 2 to forward, neutral or reverse.

In addition to the buttons 34, 36 and 38, the roller 40 and the lever 42 described above, the operator interface 26 may provide other speed and direction related functionality by leaning the joystick in left, right, forward and backward directions and/or by twisting the joystick. For example, the operator interface 26 may be twisted or pivoted about a twist axis 44 of the base portion 30 for articulating the machine 2. Relatedly, the operator interface 26 may be leaned left and right to steer the machine 2, while the operator interface may be leaned forward and backward to lift and lower the moldboard 16.

Notwithstanding the fact that the operator interface 26 has been described as being a left hand joystick for controlling the speed and direction of the machine 2, in at least some embodiments, the operator interface may be a right hand joystick. Furthermore, the operator interface 26 may be configured to provide functionality in addition or alternative to direction and speed control. For example, the operator interface 26 may be configured to control the circle 20, the drawbar 22, other work implements of the machine 2, as well as for navigating the machine.

Figure 3:
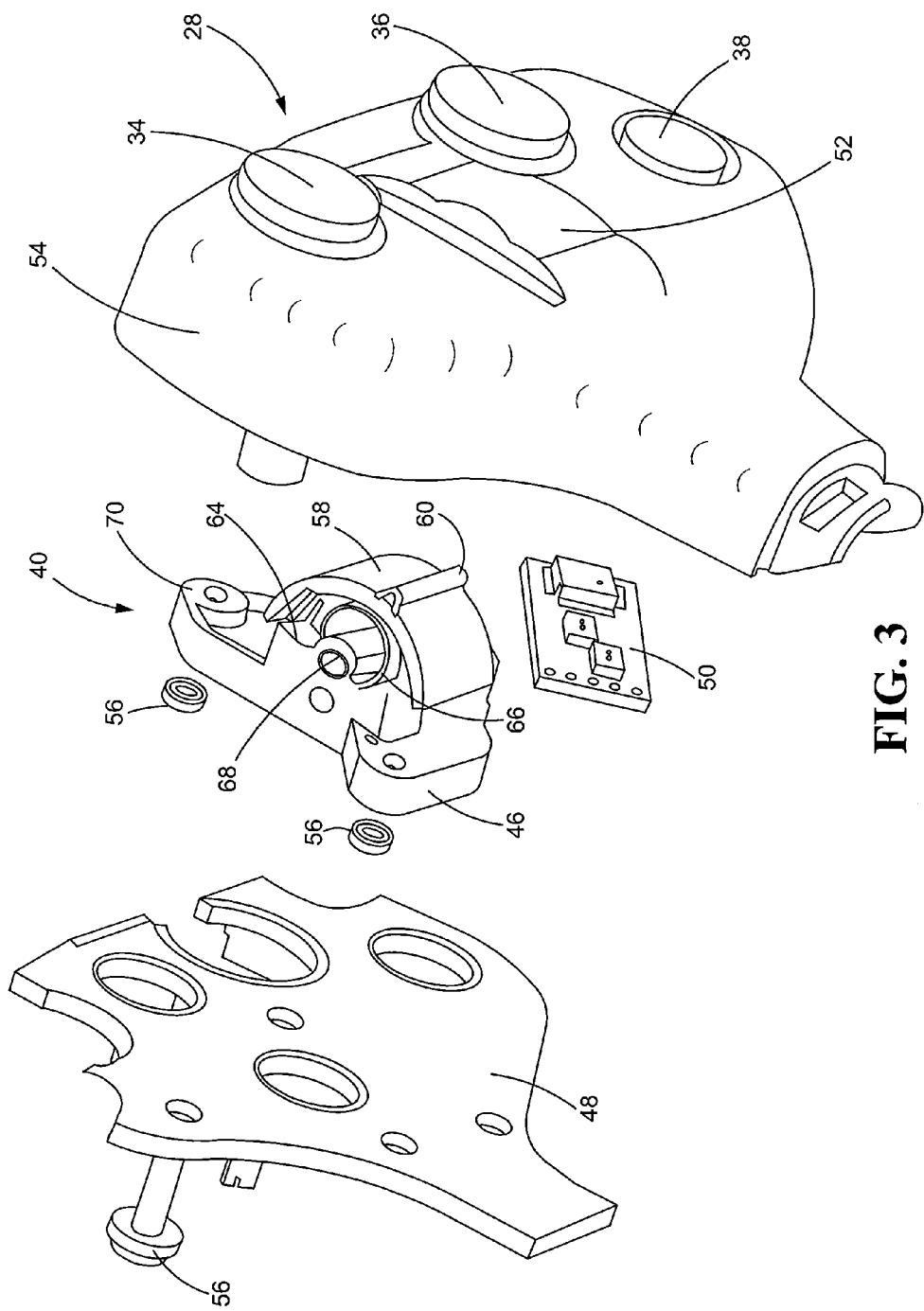
FIG. 3 is an exploded view of a thumb roller used within the operator interface of FIG. 2B.

Referring to FIG. 3 in conjunction with FIG. 2B, the structure and operation of the roller 40 will now be described in greater detail, in accordance with at least some embodiments of the present disclosure. Specifically, FIG. 3 is a partially exploded view of the upper portion 28 of the operator interface 26 that shows the various components of the roller 40. As shown, the roller 40 may include a rocker 46, a power board 48 and a sensing board 50, which may all be positioned within a slot 52 of a face plate 54 of the upper portion 28 by any of a variety of mechanical fasteners, such as, screws, nuts and bolts 56, by way of adhesives or by any other fastening mechanism.

With respect to the rocker 46, it may be a thumb actuated rocker or thumb wheel. In at least some embodiments, the rocker 46 may include an actuator blade 58 having a protrusion 60 for both, moving and indicating the location of the actuator blade with respect to a central axis 62 (See FIG. 4). The rocker 46 may also provide at least two detents defining detent points that divide the range of motion of the actuator blade 58 into discrete segments and provide at least four distinct states of advanced transmission control of the machine 2 from a single device. The detents, as well as the distinct states of machine control, are described in greater detail further below. The movement of the actuator blade 58 and crossing of the detent points may be detected by the sensing board 50, which may then cause the advanced transmission to change from one state to another. The rocker 46 may also include one or more magnets 64 and a spring 66 mounted about a shaft 68. The actuator blade 58, the magnets 64, the spring 66 and the shaft 68 may all be mounted within a roller housing 70 and may draw power for operation from the power board 48.

Figure 4:
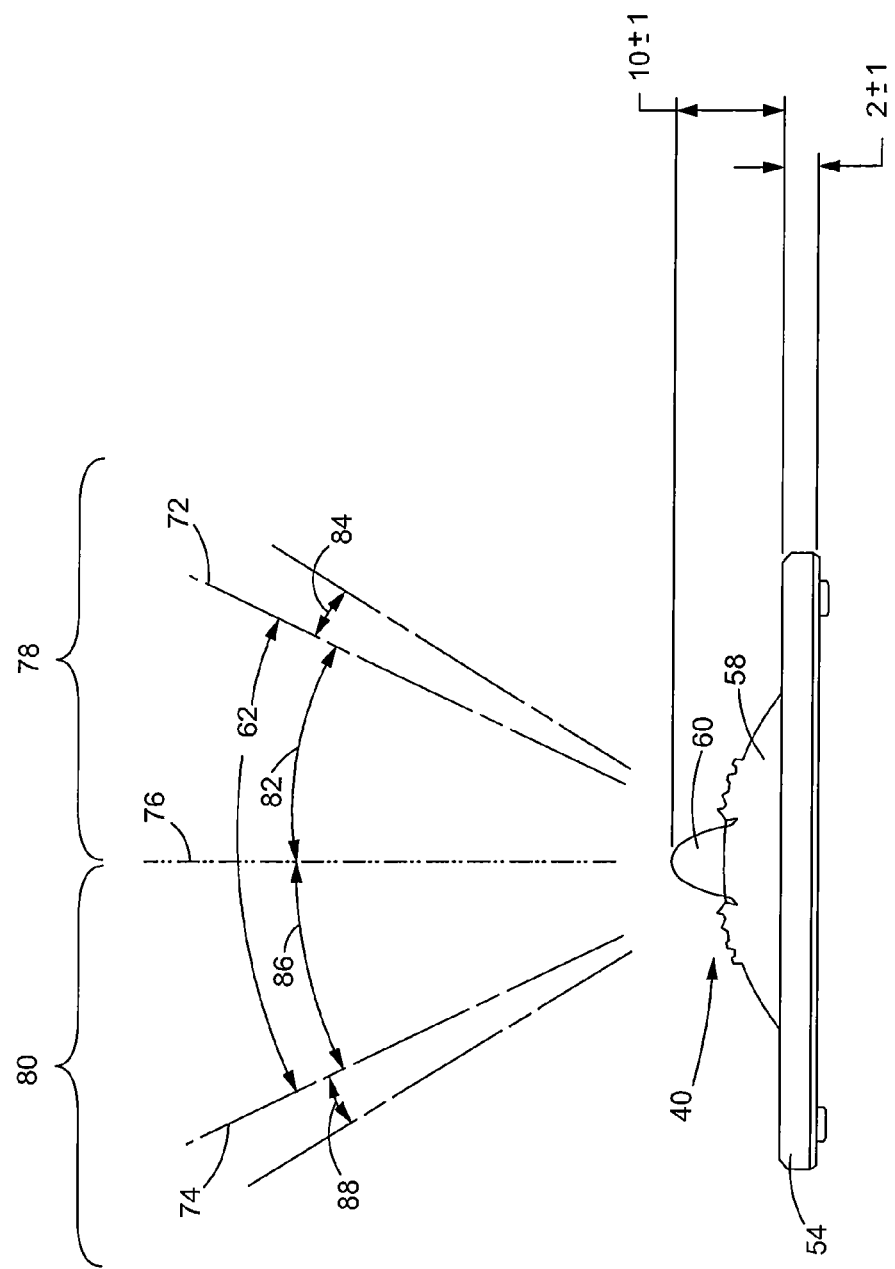
FIG. 4 is a side view showing operation of the thumb roller of FIG. 3.
Figure 5:
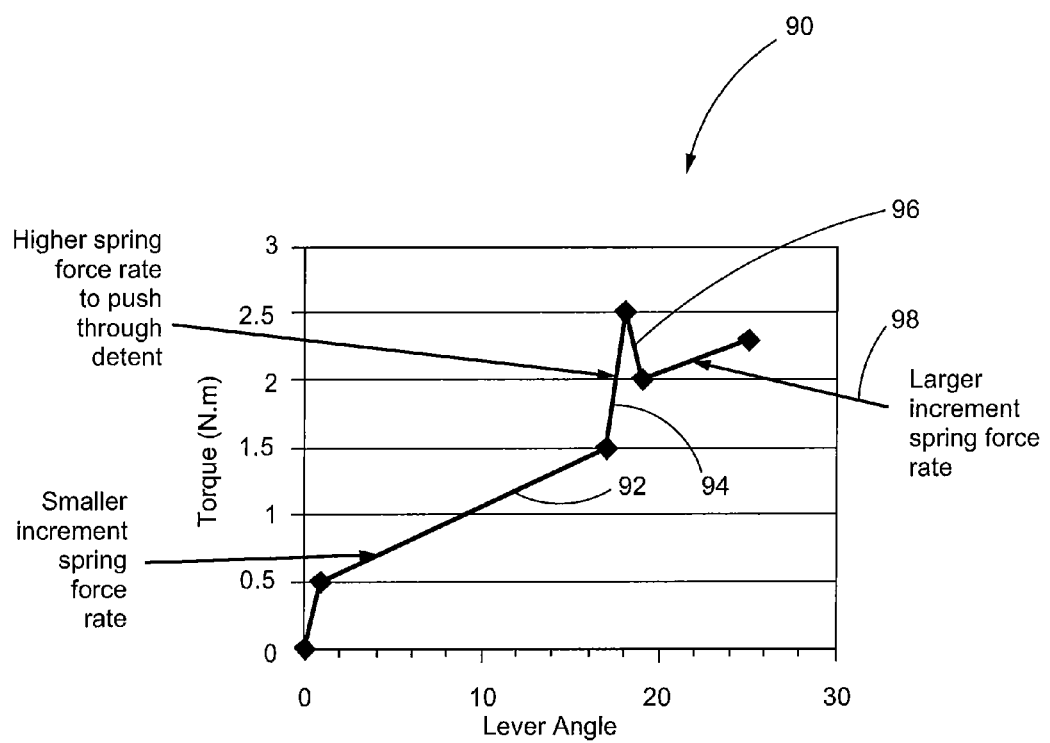
FIG. 5 is a graphical representation showing change in output torque values during the operation of the thumb roller of FIG. 4.

Turning now to FIGS. 4 and 5, the operation of the roller 40 will be described in accordance with at least some embodiments of the present disclosure. As discussed above, the roller 40 and particularly, the rocker 46 of the roller may provide at least two detent points, namely, a first detent 72 and a second detent 74, for providing at least four distinct states of speed control for controlling the transmission of the machine 2. The roller 40 may have a steady state position 76 at zero degrees. The steady state position 76 of the roller 40 may divide the operating range of the roller into two distinct regions, a speed increasing region 78 and a speed decreasing region 80 with each region having one detent point. Thus, in at least some embodiments and, as shown, the first detent 72 may provide a detent point in the speed increasing region 78 and the second detent 74 may provide a detent point in the speed decreasing region 80.

Furthermore, each of the speed increasing and the speed decreasing regions 78 and 80, respectively, may define at least two states, one on each side of the detent: a smaller increment (or decrement) state and a larger increment (or decrement) state. For example, the speed increasing region 78 may have a smaller increment state 82 and a larger increment state 84 separated from the smaller increment state by the first detent 72. Relatedly, the speed decreasing region 80 may have a smaller decrement state 86 and a larger decrement state 88 separated from the smaller decrement state by the second detent 74. Thus, a single device (i.e., the roller 40) provides at least four distinct states (the smaller increment state 82, the larger increment state 84, the smaller decrement state 86 and the larger decrement state 88) of speed commands for controlling the transmission of the machine 2. Although only one detent in each of the speed increasing and speed decreasing regions 78 and 80, respectively, has been shown for providing four states of speed control, it will be understood that in at least some embodiments, the number of detent and the number of states in each region may vary depending particularly upon the number of states of speed command that are desired and the type of transmission of the machine 2. For exemplary purposes only, a total of three, four, five, six, or more detents may be provided in various arrangements, such as, including but not limited to, two states in the speed increasing region and one state in the speed decreasing region (2-1), two states in the speed increasing region and two states in the speed decreasing region (2-2), three states in the speed increasing region and one state in the speed decreasing region (3-1), etc. without departing from the scope of the disclosure. In accordance with at least some embodiments, the rocker 46 of the roller 40 may have at least one detent to provide more than three distinct states of speed control, including at least one speed increasing state, at least one speed decreasing state, and another speed state provided in either the increasing and/or decreasing state.

In at least some embodiments, moving the roller 40 in the smaller increment state 82 and the smaller decrement state 86 (both collectively referred to as a smaller state) may provide a fine speed control, for example, an one-fifth of a gear change, a 0.1 GR (Gear Ratio), or 0.2 GR, etc., whereas moving the roller in the larger increment state 84 and the larger decrement state 88 (both collectively referred to as a larger state) may provide a quick speed control, for example, one complete gear change, a 1.0 GR, or 2.0 GR, etc. Also, the smaller state may extend on either side of the steady state position 76 up to a certain degree range (corresponding to the detents 72 and 74). For example, in at least some embodiments, the smaller increment state 82 and the smaller decrement state 86 may each extend up to about twenty degrees (20 degrees) on either side of the steady state position 76 of zero. From around twenty degrees to about twenty five degrees, the roller 40 may enter the larger increment state 84 and the larger decrement state 88. Furthermore, the angular ranges as well as the incremental changes may be the same in either direction or they may be different. For exemplary purposes only, there may be a 0.1 GR incremental change in the increasing region and a 0.2 GR incremental change in the decreasing region.

When the roller 40 is held in any one of the four aforementioned states, a continuous signal (e.g., a pulse width modulated signal) may be provided that may be sensed by the sensing board 50. In at least some embodiments, the change of states, for example, from the smaller states to the larger states may be sensed by the sensing board 50 due to a change in magnetic field as the roller 40 passes over the first and second detent points 72 and 74, respectively. The sensing board 50 may be connected at least indirectly to another controller board (not shown), which in at least some embodiments, may be situated within the base portion 30 of the operator interface 26. The controller board may then at least indirectly control the transmission of the machine 2.

Additionally, when changing from the smaller states to the larger states by crossing the detents 72 and 74, the operator may be provided tactile feedback to indicate a change in state. In at least some embodiments, the tactile feedback may be in the form of distinct change in effort level. Furthermore, as shown by a plot 90 in FIG. 5, the output torque of the roller 40 may vary as the roller is operated and moved from the steady state position 76 to the smaller and the larger states.

FIG. 5 plots torque on the Y-Axis against a lever angle from the steady state position 76 of the roller on the X-Axis. As shown, as the roller 40 is moved from the steady state position 76 (point zero on the X-Axis) into the smaller states (whether increment or decrement), the torque increases at a first smaller rate 92 and then at a second larger rate 94 right before entering the larger states (whether increment or decrement). The first smaller rate 92 may be indicative of a smaller spring force rate of the spring 66 as the roller 40 is moved from the steady state position 76. As the roller 40 continues to move in the smaller states and approaches the detents 72 or 74, the spring force required to cross over the detents increases, which may be indicated by the second larger rate 94 of the torque. The transition between the smaller and the larger states by crossing the detents 72 or 74 may result in a noticeable drop 96 in torque at the beginning of the larger states before the torque increases again as indicated by plot portion 98. In at least some embodiments, this change in torque values may also be sensed by the sensing board 50 to facilitate a change in transmission of the machine 2.

INDUSTRIAL APPLICABILITY

In general, the present disclosure sets forth an operator interface such as a joystick with a thumb actuated roller for use in a machine. The roller provides at least two detents to define at least four distinct states of speed commands in a single device: a smaller increment state, a larger increment state, a smaller decrement state and a larger decrement state. When the device is held in any one of the four states, a continuous signal is provided to facilitate speed control of the machine. When changing from the smaller increment state to the large increment state, the operator is provided tactile feedback (e.g., distinct change in effort level when pushing over the detents) to indicate change in state.

Thus, the present disclosure sets forth an intuitive operator interface to provide four discrete outputs from a single input to control a variable speed transmission. Through the four discrete outputs and tactile detents, the operator interface provides an operator with virtual transmission gear selection and gear shifting for proportionally controlling a continuously or infinitely variable transmission. By virtue of utilizing a roller to provide multiple states of transmission control, a need for having multiple push buttons, levers or other control mechanisms is also eliminated. Additionally, operator productivity is enhanced given the intuitiveness of the roller to control transmission using a single device.

While only certain embodiments have been set forth, alternatives and modifications will be apparent from the above description to those skilled in the art. These and other alternatives are considered equivalents and within the spirit and scope of this disclosure and the appended claims.

What is claimed is:

1. An operator interface for proportionally controlling a continuously variable transmission of a machine, the operator interface comprising:
   a hand operated joystick mounted on the machine; and
   a roller mounted on the joystick and operatively connected to the continuously variable transmission, the roller having a steady state position and at least two detent points for providing at least four distinct states of speed control, the at least four distinct states including at least two speed increasing states when the roller is rotated from the steady state position in a first direction and at least two speed decreasing states when the roller is rotated from the steady state position in an opposite direction,
   wherein, when the roller rotates in the first direction from the steady state position, the roller rotates through a first smaller increment state in which a force required to rotate the roller increases at a first spring force rate, the roller then rotates past a first detent point wherein the force required to rotate the roller through the first detent point increases at a higher spring force rate that is greater than the first spring force rate and then decreases at a drop rate after the first detent point, and the roller then rotates through a first larger increment state in which the force required to rotate the roller increases at a second spring force rate that is less than the higher spring force rate, and
   wherein, when the roller rotates in the second direction from the steady state position, the roller rotates through a second smaller increment state in which the force required to rotate the roller increases at the first spring force rate, the roller then rotates past a second detent point wherein the force required to rotate the roller through the second detent point increases at the higher spring force rate and then decreases at the drop rate after the second detent point, and the roller then rotates through a second larger increment state in which the force required to rotate the roller increases at the second spring force rate.

2. The operator interface of claim 1, wherein the first smaller decrement state extends from about a zero degree position of the roller to about a twenty degree position of the roller in the first direction.

3. The operator interface of claim 1, wherein the first larger decrement state extends from about a twenty degree position of the roller to about a twenty five degree position of the roller in the first direction.

4. The operator interface of claim 1, wherein the first detent point and the second detent point provide a tactile feedback when the roller moves from the first smaller increment state to the first larger increment state and from the second smaller increment state to the second larger increment state, respectively.

5. The operator interface of claim 4, wherein the tactile feedback is in the form of a change in effort level.

* * * * *